United States Patent
Imai et al.

(10) Patent No.: US 6,538,095 B2
(45) Date of Patent: Mar. 25, 2003

(54) SOLVENT-FREE TWO-COMPONENT CURABLE ADHESIVE COMPOSITION

(75) Inventors: Akihiro Imai, Osaka (JP); Taiji Morimoto, Osaka (JP); Sachio Igarashi, Osaka (JP)

(73) Assignee: Mitsui Takada Chemicals Inc., Tokyo (JP)

( * ) Notice: Subject to any disclaimer, the term of this patent is extended or adjusted under 35 U.S.C. 154(b) by 0 days.

(21) Appl. No.: 10/108,709

(22) Filed: Mar. 29, 2002

(65) Prior Publication Data

US 2002/0143133 A1 Oct. 3, 2002

Related U.S. Application Data

(63) Continuation of application No. 09/679,306, filed on Oct. 6, 2000, now abandoned.

(30) Foreign Application Priority Data

Oct. 8, 1999 (JP) ............................................. 11-288761

(51) Int. Cl.[7] ........................ C08G 18/40; C08G 18/70; C08L 75/04; C08J 175/04; B32B 27/04
(52) U.S. Cl. ...................... 528/59; 156/330; 156/331.1; 156/331.4; 156/331.7; 524/417; 524/414; 524/706; 525/438; 525/440; 525/454; 525/528; 528/60; 528/51; 528/65; 528/66; 528/73; 528/76; 528/80; 528/83; 528/85; 528/905
(58) Field of Search ............................. 528/73, 76, 80, 528/83, 85, 905, 59, 60, 65, 66, 51; 156/330, 331.1, 331.4, 331.7; 524/417, 414, 706; 525/438, 440, 454, 528

(56) References Cited

U.S. PATENT DOCUMENTS

| | | | |
|---|---|---|---|
| 4,443,590 A | 4/1984 | Kamatani et al. | 528/51 |
| 4,731,410 A | 3/1988 | Bueltjer et al. | 524/539 |
| 5,278,223 A | 1/1994 | Gruenewaelder et al. | 524/502 |
| 5,486,408 A | 1/1996 | Sentendrey | 428/220 |
| 5,731,090 A | 3/1998 | Chen | 428/423.5 |
| 5,880,167 A | 3/1999 | Krebs et al. | 521/155 |

FOREIGN PATENT DOCUMENTS

| | | |
|---|---|---|
| DE | 35 24333 | 1/1987 |
| EP | 080668 | 6/1983 |
| EP | 0 349 838 | 1/1990 |
| JP | 3-182584 | 8/1991 |
| JP | 3-234783 | 10/1991 |

*Primary Examiner*—Rabon Sergent
(74) *Attorney, Agent, or Firm*—Wenderoth, Lind & Ponack, L.L.P.

(57) ABSTRACT

The solvent-free two-component adhesive composition of the present invention comprises a polyol component (A) and a polyisocyanate component (B), and the viscosity of the mixture at 80° C. immediately after the point of time the components (A) and (B) are mixed together is 900 mPa·s or higher. The component (A) may be a polyol having a number average molecular weight of 800 or larger, or a mixture thereof, and the viscosity of the component (B) at 25° C. may be 20,000 mPa·s or higher. The composition may be used for laminating metal foil of 5 to 15 m thickness with a plastic film. By using the composition of the present invention, the occurrence of blocking due to the seepage of the adhesive from metal foil is prevented. The present invention includes a process of lamination using the same.

9 Claims, No Drawings

SOLVENT-FREE TWO-COMPONENT CURABLE ADHESIVE COMPOSITION

This application is a continuation of Ser. No. 09/679,306 filed Oct. 6, 2000 now abandoned.

FIELD OF THE INVENTION

The present invention relates to a solvent-free two-component curable adhesive composition for lamination and a process of lamination. In further detail, the present invention relates to a solvent-free two-component curable adhesive composition for lamination useful in producing materials for packaging food, beverages, medicines, and others, and to a process of lamination.

BACKGROUND OF THE INVENTION

Composite laminated films comprising metal foil such as aluminum foil have been widely used as materials for packaging food, beverages, medicines, and others. These composite laminated films can be obtained by gluing at least one side of metal foil and a plastic film of any kind together using an adhesive.

To be concrete, when bonding films to the both sides of metal foil, at first, a first plastic film is adhered to one side of the metal foil (first laminating step) and the resultant laminated foil is rolled up. The composite laminated film once rolled up is then paid out, and another plastic film is bonded to the other side of the metal foil (second laminating step). Thereafter, the resultant laminated film is rolled up again. If necessary, in some cases, the laminated metal foil is laminated with still another plastic film (e.g., third laminating step, forth laminating step).

Up to now, an organic solvent-based two-component curable adhesive being the blend of a polyisocyanate compound and at least one member selected from a polyester polyol, a polyether polyol, and a polyurethane polyol has been used as the above-described adhesive for lamination.

In recent years, for improving working environment and as a result of restrictions on the use of solvents, there is a gradual transition from the use of organic solvent-based adhesives to the use of solvent-free adhesives, and adhesive compositions being blends of a polyol component and a polyisocyanate component have come into use as solvent-free adhesives for lamination.

Conventional solvent-free adhesives, however, have the drawback of, when a roll of the laminated film after the first laminating step is left alone, permeating through the minute pinholes of metal foil and causing blocking. This leads to the problem that the composite film breaks while being rolled out or during the second laminating step. The thinner the metal foil (e.g., aluminum foil) is, the higher the rate of occurrence of such trouble is. In addition, a laminating operation under certain conditions (e.g., in the case where the composite film after the first laminating step is rolled up at a higher tension, the case where a solvent-free two-component adhesive is cured at high temperatures, the case where the amount of an adhesive applied is large) is liable to be faced with such problem.

SUMMARY OF THE INVENTION

Thus, an object of the present invention is to provide a solvent-free two-component curable adhesive composition for lamination capable of preventing the occurrence of blocking caused by an adhesive seeped through metal foil, and a process of lamination.

Another object of the present invention is to provide a solvent-free two-component curable adhesive composition for lamination capable of preventing the occurrence of blocking even in the case where metal foil such as aluminum foil is thin, and a process of lamination.

Still another object of the present invention is to provide a solvent-free two-component curable adhesive composition for lamination which is, even in the case of lamination under severe conditions, capable of inhibiting the occurrence of blocking, and a process of lamination.

The inventors of the present invention made intensive studies to achieve the above objects, and finally found that the use of a solvent-free two-component curable adhesive composition for lamination, which comprises a polyol component and a polyisocyanate component and has a specific viscosity, inhibits the occurrence of blocking due to the seepage of the adhesive through metal foil. The present invention was accomplished based on the above finding.

That is, the solvent-free two-component curable adhesive composition of the present invention comprises (A) a polyol component and (B) a polyisocyanate component, and the viscosity of the mixture at 80° C. immediately after the time the components (A) and (B) are mixed together is not less than 900 mPa·s. The component (A) may be a polyester polyol which can be obtained from a polyhydric alcohol and at least one member selected from the group consisting of an aromatic dicarboxylic acid and an aliphatic dicarboxylic acid. The number average molecular weight of the component (A) may be not less than 800 (particularly, 800 to 5,000), or the viscosity of the component (B) at 25° C. may be not less than 20,000 mPa·s (particularly, 20,000 to 1,000,000 mPa·s). The component (B) is at least one member selected from: (B1) a reaction product of a polyisocyanate and at least one member selected from a polyhydric alcohol, a polyester polyol, a polyether polyol, a polycarbonate polyol, and a polyurethane polyol; and (B2) a polyisocyanate derivative. Particularly, the component (B) is one containing a derivative of at least one diisocyanate selected from the group consisting of araliphatic diisocyanates, alicyclic diisocyanates, and aliphatic diisocyanates and may have a plurality of terminal isocyanate groups. The equivalent ratio of the isocyanate group of the component (B) to the hydroxyl group of the component (A) (NCO/OH) is about 0.4 to 10 (particularly, 0.5 to 5). The composition of the present invention may further comprise an adhesion improving agent (particularly, a coupling agent or an oxygen acid of phosphorus, epoxy resin). Moreover, the composition of the present invention may be a composition for laminating metal foil having a thickness of 5 to 15 μm with a plastic film.

The present invention further includes a process for laminating metal foil with a plastic film using the above composition.

DETAILED DESCRIPTION OF THE INVENTION

Polyol Component (A)

As the polyol component, there can be used at least one member selected from the group consisting of a polyester polyol, a polyether polyol, a polycarbonate polyol, and a polyurethane polyol, etc. There is no particular restriction as to the form (e.g., linear-, branched-chain) of the polyol component provided that the viscosity of the mixture immediately after the time the components (A) and (B) are mixed together is 900 mPa·s or higher.

The polyester polyol can be obtained through such a conventional esterification reaction as a condensation reaction between a polybasic acid and a polyhydric alcohol, a transesterification reaction between an alkyl ester of a polybasic acid and a polyhydric alcohol, a ring-opening polymerization reaction between a lactone and a polyhydric alcohol and/or a polybasic acid.

Exemplified as the polybasic acid or its alkyl ester are aliphatic dicarboxylic acids such as succinic acid, adipic acid, azelaic acid, sebacic acid, dodecanoic diacid, and dimeric acid; alicyclic dicarboxylic acids such as hexahydrophthalic acid and tetrahydrophthalic acid; aromatic dicarboxylic acids such as phthalic acid, isophthalic acid and terephthalic acid; dialkyl esters thereof (e.g., $C_{1-6}$alkyl esters), and mixtures thereof.

Examples of the polyhydric alcohol are alkanediols (e.g., $C_{2-40}$ alkane or aliphatic diols of low molecular weight such as ethylene glycol, propylene glycol, 1,4-butanediol, 1,3-butanediol, 2-methyl-1,3-propanediol, 1,5-pentanediol, 3-methyl-1,5-pentanediol, 2,4-diethyl-1,5-pentanediol, 1,6-hexanediol, neopentyl glycol, 3,3'-dimetylolheptane, 1,9-nonanediol, 1,10-decanediol, 12-hydroxystearyl alcohol, and hydrogenated dimer diols); polyoxyalkylene glycols (e.g., poly(oxy$C_{2-4}$alkylene)glycols such as diethylene glycol, triethylene glycol, polyoxyethylene glycol, dipropylene glycol, polyoxypropylene glycol, and polyoxytetramethylene glycol, and copolymers of $C_{2-4}$alkylene oxides); alkylene oxide adducts of bisphenol A or hydrogenated bisphenol A; polyols (e.g., glycerol, trimethylolpropane, pentaerythritol, sorbitol); and mixtures thereof.

Exemplified as the lactone are $C_{3-14}$ lactones such as ε-caprolactone, δ-valerolactone, and β-methyl-δ-valerolactone.

Exemplified as the polyether polyol are homo- or copolymers of alkylene oxides (e.g., $C_{2-5}$alkylene oxides such as ethylene oxide, propylene oxide, butylene oxide, tetrahydrofuran, 3-methyltetrahydrofuran, and oxetane compounds).

Exemplified as the polycarbonate poloyol is a polycarbonate diol obtained through the reaction between a short chain dialkyl carbonate (e.g., di$C_{1-4}$alkyl carbonate such as dimethyl carbonate, diethyl carbonate) and at least one member selected from the group consisting of the above-mentioned polyhydric alcohol, polyester polyol, and the polyether polyol.

The polyurethane polyol can be obtained by reacting a polyisocyanate with at least one member selected from the group consisting of the above-mentioned polyhydric alcohol, the polyester polyol, the polyether polyol, and the polycarbonate polyol.

Exemplified as the polyisocyanate are polyisocyanate monomers and their derivatives that are ordinarily employed in the production of polyurethane.

Included among the polyisocyanate monomers are, for example, aromatic diisocyanates, araliphatic diisocyanates, alicyclic diisocyanates, and aliphatic diisocyanates.

Examples of the aromatic diisocyanates are m- or p-phenylene diisocyanate and mixtures thereof, 4,4'-diphenyl diisocyanate, 1,5-naphthalene diisocyanate (NDI), 4,4'-, 2,4'-, or 2,2'-diphenyl methane diisocyanate and mixtures thereof (MDI), 2,4- or 2,6-trilene diisocyanate and mixtures thereof (TDI), 4,4'-toluidine diisocyanate (TODI), and 4,4'-diphenylether diisocyanate.

Examples of the araliphatic diisocyanates are 1,3-, or 1,4-xylylene diisocyanate and mixtures thereof (XDI); 1,3- or 1,4-tetramethylxylylene diisocyanate and mixtures thereof (TMXDI), and Ω, Ω'-diisocyanate-1,4-diethylbenzene.

Examples of the alicyclic diisocyanates are 1,3-cyclopentene diisocyanate, 1,4-cyclohexane diisocyanate, 1,3-cyclohexane diisocyanate, 3-isocyanatemethyl-3,5,5-trimethylcyclohexyl isocyanate (isophorone diisocyanate: IPDI), 4,4'-, 2,4'-, or 2,2'-dicyclohexylmethane diisocyanate and mixtures thereof (hydrogenated MDI), methyl-2,4-cyclohexanediisocyanate, methyl-2,6-cyclohexane diisocyanate, 1,3-, or 1,4-bis(isocyanatemethyl)cyclohexane and mixtures thereof (hydrogenated XDI).

As the aliphatic diisocyanates, there are mentioned trimethylene diisocyanate, teteramethylene diisocyanate, hexamethylene diisocynate (HDI), pentamethylene diisocyanate, 1,2-, 2,3-, or 1,3-butylene diisocyanate, and 2,4,4-, or 2,2, 4-trimethylhexamethylene diisocyanate.

Exemplified as the derivatives of polyisocyanate monomers are oligomers (e.g., dimers, trimers) of the polyisocyanate monomers mentioned above; modified oligomers (e.g., modified dimers, modified trimers); modified biuret formed by the reaction of any of the above-mentioned polyisocyanate monomer with water; modified allophanate formed by the reaction of any of the above-mentioned polyisocyanate monomer with a polyhydric alcohol; oxadiazinetrione formed by the reaction of any of the above-mentioned polyisocyanate monomer with a carbonic acid gas.

When the component (A) is a polyurethane polyol, there can be used a terminal hydroxypolyurethane having an equivalent ratio of the isocyanate group of the polyisocyanate component to the hydroxyl group of the polyol component (NCO/OH) of smaller than 1.

Of these polyols, polyester polyols, particularly those that can be obtained from at least one polybasic acid selected from the group consisting of an aromatic dicarboxylic acid (e.g., isophthalic acid, terephthalic acid, and alkyl esters thereof) and an aliphatic dicarboxylic acid (e.g., adipic acid, sebacic acid, azelaic acid), and a polyhydric alcohol (e.g., ethylene glycol, diethylene glycol, 1,4-butanediol, 1,3-butanediol, neopentyl glycol, 1,6-hexanediol) are preferable.

These components (A) can be used either singly or in combination. The number average molecular weight of the component (A) is 800 or more (e.g., 800 to 5,000) and preferably 800 to 3,000 (e.g., 850 to 2,000). If the number average molecular weight is smaller than 800, the components of the adhesive will pass through the pinholes of metal foil, and the film after the first laminating step shows the tendency of blocking. Particularly, when the viscosity of the component (B) at 25° C. is smaller than 20,000 mPa·s, it is preferred that the number average molecular weight of the component (A) is 800 or more. On the other hand, if the number average molecular weight is greater than 5,000, the viscosity becomes too high, and this results in difficulty in coating the composition.

Polyisocyanate Component (B)

There is no particular restriction as to the polyisocyanate component (B) provided that the component (B) has a plurality of terminal isocyanate groups and the viscosity of the mixture at 80° C. immediately after the time the components (A) and (B) are mixed together is 900 mPa·s or higher. Among others, preferred as the component (B) are components containing a derivative (e.g., dimer, trimer, trimers in which part of the NCO group is modified or reacted with a mono- or polyol, a polyisocyanate containing a biuret unit, a polyisoycanate containing an allophanate unit) of at least one diisocyanate selected from an araliphatic diisocyanate (e.g., XDI), an alicyclic diisocyanate (e.g., IPDI), and an aliphatic diisocyanate (e.g., HDI), with components containing a trimer in which the NCO group is partially modified or reacted with a mono-ol (e.g., $C_{1-6}$ alcohols such as t-butanol) or a polyol (e.g., polyols such as alkanediol and polyoxyalkylene glycol) and components containing a biuret unit-containing polyisocyanate particularly preferred. The component (B) may comprise a terminal isocyanate group-containing oligomer (e.g., a reaction product of polyisocyanate and at least one member selected from, e.g., the aforementioned polyhydric alcohols, polyester polyols, polyether polyols, polycarbonate polyols, and the polyurethane polyols). Particulalry, it may comprise a reaction product of a polyester polyol and polyisocyanate.

The terminal isocyanate group-containing oligomer need only have an equivalent ratio of the isocynate group of the polyisocyanate component to the hydroxyl group of the polyol component (NCO/OH) exceeding 1, and the ratio is preferably about 1.5 to 3, more preferably about 1.7 to 3 (e.g., 2 to 2.5).

These components (B) can be used either singly or in combination. The viscosity of the component (B) at 25° C. is about 20,000 mPa·s or higher (e.g., 20,000 to 1,000,000 mPa·s) and preferably about 20,000 to 500,000 mPa·s. If the viscosity of the component (B) at 25° C. is lower than 20,000 mPa·s, the components of the adhesive pass through the pinholes of metal foil, and the film shows the tendency of blocking after the first laminating step. Particularly, in the case where the number average molecular weight of the component (A) is smaller than 800, it is preferred that the viscosity of the component (B) at 25° C. is 20,000 mPa·s or higher. With such viscosity, although the number average molecular weight of the component (A) is smaller than 800, the occurrence of blocking is effectively prevented. On the other hand, if the viscosity is higher than 1,000,000 mPa·s, the possibility of the coating step becoming difficult will arise.

In the present invention, although what is required is only that the number average molecular weight of the component (A) is 800 or greater, or that the viscosity of the component (B) at 25° C. is 20,000 mPa·s or higher, it is preferred that both conditions are met.

The solvent-free two-component curable adhesive for lamination can be obtained by blending the components (A) and (B). The compounding ratio of the component (A) to the component (B) can be selected such that the equivalent ratio of the isocyanate group of the component (B) to the hydroxyl group of the component (A) (NCO/OH) is within the range of about 0.4 to 10, preferably about 0.5 to 5, and particularly about 0.6 to 2.5.

Additive

If necessary, to the adhesive composition of the present invention may be added an additive(s). Exemplified as the additive is an adhesion improving agent of at least one member selected from the group consisting of coupling agents (silane coupling agent, titanium coupling agent, particularly silane coupling agent), oxygen acids of phosphorus (e.g., orthophosphoric acid, metaphosphoric acid, polyphosphoric acid), derivatives thereof, and epoxy resin. The silane coupling agent has at least an alkoxysilyl group (particularly, a $C_{1-2}$ alkoxysilyl group), and may have such a functional group as an isocyanate group, a polymerizable group (e.g., vinyl group, (meth)acryloyl group), a glycidyl group, an N-substituted amino group, carboxyl group, and mercapto group. Examples of the epoxy resin mentioned above are bisphenol-based epoxy resins of A, F, and AD type, bromine-containing epoxy resins, phenol or cresol-based epoxy resins, cyclic aliphatic epoxy resins, glycidyl ester-based epoxy resins, glycidylamine-type epoxy resins, and heterocyclic epoxy resins. Bisphenol-based epoxy resins (particularly, bisphenol A-based epoxy resins) are usually employed. The number average molecular weight of such additive is usually about 700 or smaller, and preferably about 80 to 600 (e.g., 100 to 600).

Further, as an additive, to the composition may be added: a catalyst for controlling a curing reaction; a coatability improving agent; a leveling agent; an antifoaming agent; a stabilizer typified by an antioxidant and an ultraviolet ray absorber; a plasticizer; a surfactant; a coloring pigment; organic or inorganic particulates; and others.

The adhesive composition may incorporate these additives in a proportion of, per 100 parts by weight of the component (A), about 0.001 to 5 parts by weight, preferably about 0.01 to 5 parts by weight. If the amount of the additive(s) used (particularly, total amount) is smaller than 0.001 part by weight, the effects of the additive(s) are hardly shown. If the amount is greater than 5 parts by weight and the additive(s) are of low-molecular weight, the adhesive is drawn into the pinholes along with the additive(s) and passes therethrough, and the film shows the tendency of blocking in the first lamiantion step.

Solvent-Free Two-Component Curable Adhesive Composition For Lamination

The solvent-free two-component curable adhesive composition for lamination of the present invention formed by blending the above-described components can be used in bonding metal foil and a plastic film together with the use of an ordinary laminator for solvent-free adhesives.

The viscosity of the mixture immediately after the time the components (A) and (B) are mixed together at 80° C. is about 900 mPa·s or higher (900 to 10,000 mPa·s). Preferably, the viscosity is within the range of about 900 to 5,000 mPa·s, and more preferably about 900 to 3,000 mPa·s. If the viscosity is too low, the possibility of delamination due to a weak initial cohesive force will arise. If the viscosity is too high, there will arise the possibility of the coating step becoming difficult leading to detraction of the external appearance. Incidentally, the phrase "immediately after" the mixing means not longer than 5 minutes has passed after the mixing of the components to uniformity.

Process of Lamination

The adhesive composition of the present invention is useful in laminating metal foil with a plastic film. Exemplified as the metal foil is spreadable metal foil (e.g., aluminum foil, gold foil). The thickness of the metal foil is, for example, 5 to 100 μm, preferably about 5 to 20 μm, and more preferably about 5 to 15 μm (particularly, 5 to 10 μm).

Exemplified as the plastic film are films of olefinic polymers (e.g., polyethylene, polypropylene), polyester-series polymers (e.g., polyalkylene terephthalates typified by polyethylene terephthalate and polybutylene terephthalate; polyalkylene naphthalates; and copolyesters of which the main component is any of these polyalkylene arylate units); polyamide-series polymers (e.g., nylon 6, nylon 66); and vinyl-series polymers (e.g., polyvinyl chloride, ethylene-vinyl acetate copolymer). These plastic films may be non-stretched films (non-stretched polyethylene, polypropylene, and others) or stretched films (e.g., biaxially stretched polypropylene, polyalkylene terephthalate, nylon), and either will do. The surface (the surface on which the adhesive composition is applied, or the surface on which the adhesive composition is corona discharge treatment. The surface may be provided with a primer layer of, e.g., an anchor coat agent. Moreover, there may be used a composite laminated film constituted of an extruded film of any kind and the above-described film previously bonded together with another adhesive. The thickness of the plastic film is usually about 5 to 200 μm. The plastic film described above may be one with an image printed thereon.

It is not critical whether one side of the metal foil is laminated with the plastic film or both sides of the metal foil are laminated with the plastic film (second laminating step). Usually, the metal foil is laminated with the plastic film in the first laminating step to be a composite film, and the composite film is rolled up on a batch-up roll and, after being aged if necessary, rolled out for further laminated in the second laminating step. The composite film thus laminated twice is rolled up on a batch-up roll and, if necessary, aged. In the first laminating step, usually, the adhesive composition is applied onto the plastic film and the plastic film is then bonded to metal foil such as aluminum foil. Before being subjected to the second laminating step, the composite laminated film may be heated/aged (e.g., aging at 25 to 60° C.) for having the adhesive begin its curing reaction, or the composite film may be subjected to the second laminating step directly without being aged. Blocking tends to occur during the heating or aging step. The adhesive composition of the present invention, however, prevents the occurrence of blocking even if the composite film is heated/aged after the first laminating step. The adhesive composition of the present invention need only be used at least in the first laminating step. An adhesive for use in the second and the following laminating steps may be any adhesive for lamination, and not only solvent-free adhesives but also solvent- or water-based adhesives are also available.

When applying (coating) the adhesive composition, it is preferred that the adhesive composition is heated at a temperature within the range of about 50 to 100° C. (preferably, 50 to 90° C., more preferably 50 to 80° C.) until it acquires a suitable viscosity. The suitable viscosity is, at a given temperature within the above-mentioned range, about 100 to 5,000 mPa·s and preferably about 300 to 3,000 mPa·s. If the temperature is above 100° C., before being coated, the adhesive composition begins to generate heat as a result of the reaction between the component (A) and the component (B) and gets viscous acceleratingly. This could lead to detraction in external appearance.

The amount of the adhesive composition of the present invention to be applied is, in each laminating step, about 0.5 to 5 g/m², preferably about 1 to 3 g/m², and more preferably about 1.5 to 2 g/m². If the amount of the adhesive composition applied is smaller than 0.5 g/m², there arise the possibilities that its adhesive properties cannot be fully exhibited and the external appearance becomes poor. Moreover, if the amount of the adhesive composition applied is larger than 5 g/m², the adhesive seeps from the edge of the film, causing troubles in the production of composite laminated films.

According to the present invention, even when producing a composite laminated film comprising such thin metal foil as aluminum foil with the use of a solvent-free two-component curable adhesive for lamination, it is possible to effectively inhibit the occurrence of blocking due to the permeation of the adhesive through the metal foil.

EXAMPLES

The following examples are intended to describe this invention in further detail and should by no means be construed as defining the scope of the invention.

Production Example 1

Into a reactor were fed 291.56 g of dimethyl terephthalate, 748.32 g of isophthalic acid, 368.22 g of ethylene glycol, 100.01 g of neopentyl glycol, 340.43 g of 1,2-hexanediol, and 0.18 g of zinc acetate, and the mixture was subjected to an esterification reaction in a stream of nitrogen at 180 to 220° C. After predetermined amounts of water and methanol had been distilled off, to the reaction product was added 282.61 g of azelaic acid, and the resultant mixture was subjected to an esterification reaction at 180 t0 220° C. to yield a polyester polyol "a" having a number average molecular weight of about 900.

Production Example 2

Into a reactor were fed 272.1 g of dimethyl terephthalate, 698.64 g of isophthalic acid, 329.55 g of ethylene glycol, 89.51 g of neopentyl glycol, 304.68 g of 1.6-hexanediol, and 0.165 g of zinc acetate, and the mixture was subjected to an esterification reaction in a stream of nitrogen at 180 to 220° C. After predetermined amounts of water and methanol had been distilled off, to the reaction product was added 263.85 g of azelaic acid, and the resultant mixture was subjected to an esterification reaction at 180 to 220° C. to yield a polyester polyol "b" having a number average molecular weight of about 1,100.

Production Example 3

Into a reactor were fed 199.32 g of dimethyl terephthalate, 511.57 g of isophthalic acid, 237.5 g of ethylene glycol, 64.5 g of neopentyl glycol, 219.57 g of 1,6-hexanediol, and 0.12 g of zinc acetate, and the mixture was subjected to an esterification reaction in a stream of nitrogen at 180 to 220° C. After predetermined amounts of water and methanol had been distilled off, to the reaction product was added 193.2 g of azelaic acid, and the resultant mixture was subjected to an esterification reaction at 180 to 220° C. to yield a polyester polyol "c" having a number average molecular weight of about 1,200.

Production Example 4

Into a reactor were fed 223.19 g of dimethyl terephthalate, 572.84 g of isophthalic acid, 338.77 g of ethylene glycol, 92.01 g of neopentyl glycol, 313.2 g of 1,2-hexanediol, and 0.15 g of zinc acetate, and the mixture was subjected to an esterification reaction in a stream of nitrogen at 180 to 220° C. After predetermined amounts of water and methanol had been distilled off, to the reaction product was added 216.34 g of azelaic acid, and the resultant mixture was subjected to an esterification reaction at 180 to 220° C. to yield a polyester polyol "d" having a number average molecular weight of about 500.

Production Example 5

Into a reactor were fed 720.68 g of isophthalic acid, 193.96 g of ethylene glycol, 262.28 g of neopentyl glycol, 378.76 g of 1,6-hexanediol, 150.14 g of diethylene glycol, and 0.18 g of zinc acetate, and the mixture was subjected to an esterification reaction in a stream of nitrogen at 180 to 220° C. After the predetermined amount of water had been distilled off, to the reaction product was added 326.6 g of azelaic acid, and the resultant mixture was subjected to an esterification reaction at 180 to 220° C. to yield a polyester polyol "e" having a number average molecular weight of about 450.

Production Example 6

To a reactor were fed 292.5 g of the polyester polyol "e" obtained in Production Example 5 and 1,223.21 g of xylylene diisocyanate, and the mixture was subjected to a urethanization reaction in a stream of nitrogen at 70 to 80° C. Thereafter, xylylene diisocyanate left unreacted was removed from the reaction product by Smith distillation, and a polyisocyanate "f" having a viscosity at 25° C. of 470,000 mPa·s was obtained.

Production Example 7

Into a reactor were fed 325 g of the polyester polyol "d" obtained in Production Example 4 and 1223.21 g of xylylene diisocyanate, and the mixture was subjected to a urethanization reaction in a stream of nitrogen at 70 to 80° C. Thereafter, xylylene diisocyanate left unreacted was removed from the reaction product by Smith distillation, and a polyisocyanate "g" having a viscosity of 730,000 mPa·s at 25° C. was obtained.

Production Example 8

Five hundred grams (500 g) of the polyisocyanate "f" obtained in Production Example 6 and 500 g of a polyisocyanate component (manufactured by Takeda Chemical Industries, Ltd., Takenate D-177N) being the trimer of an aliphatic polyisocyanate with its NCO group partially reacted with a mono-ol were mixed together in a stream of nitrogen at 50° C. to uniformity to yield a polyisocyanate component A having a viscosity of 7,500 mPa·s at 25° C.

Production Example 9

Six hundred grams (600 g) of the polyisocyanate "f" obtained in Production Example 6 and 300 g of a polyisocyanate component (manufactured by Takeda Chemical Industries, Ltd., Takenate D-177N) being the trimer of an aliphatic polyisocyanate with its NCO group partially reacted with a mono-ol were mixed together in a stream of nitrogen at 50° C. to uniformity to yield a polyisocyanate component B having a viscosity of 32,500 mPa·s at 25° C.

Production Example 10

Seven hundred and fifty grams (750 g) of the polyisocyanate "f" obtained in Production Example 6 and 250 g of a polyisocyanate component (manufactured by Takeda Chemical Industries, Ltd., Takenate D-177N) being the trimer of an aliphatic polyisocyanate with its NCO group partially reacted with a mono-ol were mixed together in a stream of nitrogen at 50° C. to uniformity to yield a polyisocyanate component C having a viscosity of 68,300 mPa·s at 25° C.

Production Example 11

Seven hundred and fifty grams (750g) of the polyisocyanate "g" obtained in Production Example 7 and 250 g of a polyisocyanate component (manufactured by Takeda Chemical Industries, Ltd., Takenate D-170N) being the trimer of an aliphatic polyisocyanate with its NCO group partially reacted with a diol were mixed together in a stream of nitrogen at 50° C. to uniformity to yield a polyisocyanate component D having a viscosity of 100,000 mPa·s at 25° C.

Production Example 12

Seven hundred and fifty grams (750g) of an araliphatic polyisocyanate containing a biuret unit formed by removing the solvent from Takenate A-14 (manufactured by Takeda Chemical Industries, Ltd.) was uniformly mixed with 250 g of a polyisocyanate component being the trimer of an aliphatic polyisocyanate with its NCO group partially reacted with a mono-ol (manufactured by Takeda Chemical Industries, Ltd., Takenate D-177N) containing a trimer of a polyisocyanate in a stream of nitrogen at 50° C. to yield and a polyisocyanate component E having a viscosity of 25,000 mPa·s at 25° C.

Examples and Comparative Examples

The polyester polyols "a" to "c", the polyisocyanate components A to E obtained in the above Production Examples, and the following various additives were blended in proportions shown in Table 1 to prepare adhesives for lamination. Thereafter, using the adhesives thus obtained, composite films were fabricated in the following manner. From the viewpoint of blocking, each composite film was evaluated in the following manner. The results are shown in Table 2.

Additives

Silane coupling agent: manufactured by Shinetsu Kagaku Kogyo, K.K., KBE-403

Silane coupling agent: manufactured by Shinetsu Kagaku Kogyo, K.K., KBE-603

Phosphoric acid: manufactured by Wako Junyaku Kogyo, K.K.

Polyol Components Used in Comparative Examples

Polyol component: manufactured by Takeda Chemical Industries, Ltd., Takelac A-660

Polyol component: manufactured by Takeda Chemical Industries, Ltd., Takelac A-658

Polyisocyanate Components Used in Comparative Examples

Polyisocyanate component: manufactured by Takeda Chemical Industries, Ltd., Takenate A-70HN Polyisocyanate component: manufactured by Takeda Chemical Industries, Ltd., Takenate A-65

Fabrication of Composite Film

A composite film composed of two layers, one of the nylon film (thickness: 15 mm) and the other of aluminum foil (7 mm), was fabricated by:

applying each of the adhesives for lamination of Examples and Comparative Examples onto a nylon film using a laminating machine for solvent-free adhesives such that the amount of the adhesive applied was 1.5 to 2 g/m$^2$ bonding the film thus obtained and aluminum foil together; and aging the roll of the resultant film at 40° C. for one day.

Evaluation of Blocking

Fifty meters of the composite film fabricated was paid out from the roll by a machine, and the film was evaluated by whether the peeling sound was made while the film was being unrolled.

A: no sound

B: sound was made

TABLE 1 (1)

| | Polyol component (parts by weight) | | | | | | | |
|---|---|---|---|---|---|---|---|---|
| | a | b | c | | | Phosphoric | A-660 | A-658 |
| NAMW* | 900 | 1,100 | 1,200 | KBE-403 | KBE-603 | acid | 600 | 640 |
| Viscosity at 25° C. (mPa · s) | 1,000,000 | 2,000,000 | 2,700,000 | | | | 200,000 | 500,000 |
| Ex. 1 | 100 | — | — | 2 | 1 | 0.05 | — | — |
| Ex. 2 | 100 | — | — | 2 | 1 | 0.05 | — | — |

TABLE 1 (1)-continued

| | Polyol component (parts by weight) | | | | | | | |
|---|---|---|---|---|---|---|---|---|
| NAMW* | a 900 | b 1,100 | c 1,200 | KBE-403 | KBE-603 | Phosphoric acid | A-660 600 | A-658 640 |
| Ex. 3 | — | 100 | — | 2 | 1 | 0.05 | — | — |
| Ex. 4 | 100 | — | — | 2 | 1 | 0.05 | — | — |
| Ex. 5 | — | — | 100 | 2 | 1 | 0.05 | — | — |
| Ex. 6 | 100 | — | — | 2 | 1 | 0.05 | — | — |
| Comp. Ex. 1 | — | — | — | — | — | — | 100 | — |
| Comp. Ex. 2 | — | — | — | — | — | — | — | 100 |
| Comp. Ex. 3 | 100 | — | — | 2 | 1 | 0.05 | — | — |

*Number Average Molecular Weight

TABLE 1 (2)

| | Polyisocyanate component (parts by weight) | | | | | | |
|---|---|---|---|---|---|---|---|
| NAMW* | A 600 | B 660 | C 700 | D 800 | E 570 | A-70HN 540 | A-65 540 |
| Viscosity at 25° C. (mPa·s) | 7,500 | 32,500 | 68,300 | 100,000 | 25,000 | 700 | 1,200 |
| Ex. 1 | — | 60 | — | — | — | — | — |
| Ex. 2 | — | — | 65 | — | — | — | — |
| Ex. 3 | 50 | — | — | — | — | — | — |
| Ex. 4 | — | — | — | — | 40 | — | — |
| Ex. 5 | — | — | — | — | 30 | — | — |
| Ex. 6 | — | — | — | 80 | — | — | — |
| Comp. Ex. 1 | — | — | — | — | — | 40 | — |
| Comp. Ex. 2 | — | — | — | — | — | — | 40 |
| Comp. Ex. 3 | 55 | — | — | — | — | — | — |

TABLE 2

| | Viscosity immediately after the mixing at 80° C. (mPa·s) | Coating temperature (° C.) | Coating viscosity (mPa·s) | Blocking |
|---|---|---|---|---|
| Ex. 1 | 1,100 | 83 | 1,000 | A |
| Ex. 2 | 1,500 | 88 | 1,000 | A |
| Ex. 3 | 1,100 | 80 | 1,100 | A |
| Ex. 4 | 1,300 | 75 | 2,000 | A |
| Ex. 5 | 2,800 | 85 | 2,000 | A |
| Ex. 6 | 2,100 | 80 | 2,100 | A |
| Comp. Ex. 1 | 400 | 60 | 1,000 | B |
| Comp. Ex. 2 | 750 | 70 | 1,000 | B |
| Comp. Ex. 3 | 850 | 75 | 1,200 | B |

What is claimed is:

1. A solvent-free two-component curable adhesive composition, which consists essentially of a polyol component (A) and a polyisocyanate component (B);
   wherein upon mixing said component (A) and said component (B), the viscosity of said mixture at 800° C immediately after the time said component (A) and said component (B) are mixed together is 900 to 10,000 mPa·s;
   and wherein (i) the number average molecular weight of said component (A) is not less than 800, and the viscosity of said component (B) at 25° C. is 7500 to 1,000,000 mPa·s, or
   (ii) the viscosity of said component (B) at 25° C. is 20,000 to 500,000 mPa·s.

2. A composition according to claim 1, wherein the component (B) has a plurality of terminal isocyanate groups and is at least one member selected from the following (B1) and (B2):
   (B1) a reaction product of a polyisocyanate and at least one member selected from the group consisting of a polyhydric alcohol, a polyester polyol, a polyether polyol, a polycarbonate polyol, and a polyurethane polyol;
   (B2) a polyisocyanate derivative.

3. A composition according to claim 1, wherein said component (B) comprises an isocyanate group and said component (A) comprises a hydroxyl group; and wherein the equivalent ratio of said isocyanate group of component (B) to said hydroxyl group of component (A), NCO/OH, is 0.4/1 to 10/1.

4. A composition according to claim 1, which further comprises an adhesion improving agent.

5. A composition according to claim 4, wherein the adhesion improving agent is at least one member selected from the group consisting of a coupling agent, an oxygen acid of phosphorus, and an epoxy resin.

6. A composition according to claim 1, wherein said component (B) contains a derivative of at least one diisocyanate selected from the group consisting of an araliphatic diisocyanate, an alicyclic diisocyanate and an aliphatic diisocyanate,
   and wherein said derivative is at least one member selected from the group consisting of a dimer (a), a trimer (b), a trimer (c) in which part of the NCO group is modified or reacted with a mono- or polyol, a polyisocyanate (d) containing a biuret unit, and a polyisocyanate (e) containing an allophanate unit.

7. A solvent-free two-component curable adhesive composition, which comprises:
   a polyester polyol component (A), comprising a hydroxyl group, obtained from a polyhydric alcohol and a polybasic acid selected from the group consisting of an aromatic dicarboxylic avid and an aliphatic dicarboxylic acid and having a number average molecular weight of 800 to 5,000;
   a polyisocyanate component (B), comprising an isocyanate group, having a derivative of at least one diisocyanate selected from the group consisting of an araliphatic diisocyanate, an alicyclic diisocyanate, and an aliphatic diisocyanate and having a viscosity at 25° C. of 7,500 to 1,000,000 mPa·s;
   wherein the equivalent ratio of said isocyanate group of component (B) to said hydroxyl group of component (A), NCO/OH, is 0.5/1 to 5/1;
   and wherein when said component (A) and said component (B) are mixed, the viscosity of said mixture within 5 minutes alter the time said component (A) and said component (B) are mixed together at 80° C. is 900 to 10,000 mPa·s.

8. A process for laminating a metal foil with a plastic film, which comprises mixing the adhesive composition as recited in claim 1, applying said composition to at least one member selected from a metal foil and a plastic film, and bonding said metal foil with said plastic film.

9. A process to according to claim 8, wherein the thickness of the metal foil is 5 to 15 $\mu$m.

* * * * *

UNITED STATES PATENT AND TRADEMARK OFFICE
CERTIFICATE OF CORRECTION

PATENT NO.    : 6,538,095 B2
DATED         : March 25, 2003
INVENTOR(S)   : Akihiro Imai et al.

It is certified that error appears in the above-identified patent and that said Letters Patent is hereby corrected as shown below:

Column 11,
Line 58, please change "800ºC" to -- 80º C --

Column 12,
Line 54, please change "avid" to -- acid --.

Signed and Sealed this

Ninth Day of December, 2003

JAMES E. ROGAN
*Director of the United States Patent and Trademark Office*